(12) United States Patent
Morgan et al.

(10) Patent No.: US 7,043,880 B2
(45) Date of Patent: *May 16, 2006

(54) IN SITU MOLDED THERMAL BARRIERS

(75) Inventors: Michael D. Morgan, Billerica, MA (US); Xiudong Sun, Arlington, MA (US); Laura A. Tennenhouse, Belmont, MA (US); Robert A. Wiercinski, Lincoln, MA (US); Benita Dair, Somerville, MA (US); Antonio J. Aldykiewicz, Jr., Brookline, MA (US); Leon Bablouzian, Framingham, MA (US); Lawrence Shapiro, Mansfield, MA (US); William J. Hurley, Jr., Needham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/413,981

(22) Filed: Apr. 15, 2003

(65) Prior Publication Data
US 2003/0213211 A1 Nov. 20, 2003

Related U.S. Application Data

(62) Division of application No. 09/999,307, filed on Oct. 31, 2001, now Pat. No. 6,698,146.

(51) Int. Cl.
*E04H 15/20* (2006.01)

(52) U.S. Cl. .......................... 52/2.23; 52/2.17; 52/232; 52/317

(58) Field of Classification Search .................. 52/232, 52/741.3, 220.8, 742.13, 241, 317, 788.1, 52/783.19, 254, 2.15, 2.17, 2.22, 2.23, 783.1; 428/76, 68, 624, 69, 74; 383/3, 120, 110; 206/522

See application file for complete search history.

(56) References Cited

U.S. PATENT DOCUMENTS

| | | | |
|---|---|---|---|
| 2,252,578 A | | 8/1941 | Powell |
| 2,971,616 A | | 2/1961 | Bayley, Jr. |
| 3,264,165 A | * | 8/1966 | Stickel .......................... 428/69 |
| 3,297,233 A | * | 1/1967 | Meyerhoefer ................ 55/375 |
| 3,751,881 A | * | 8/1973 | Hughes ........................ 55/367 |
| 3,854,253 A | | 12/1974 | Slowbe |
| 3,859,064 A | * | 1/1975 | Cordell .......................... 55/368 |
| 3,918,512 A | | 11/1975 | Kuneman |

(Continued)

FOREIGN PATENT DOCUMENTS

JP 11117424 4/1999

(Continued)

OTHER PUBLICATIONS

ASTM, "Standard Test Method for Cyclic Movement and Measuring the Minimum and Maximum Joint Widths of Architectural Joint Systems", Nov. 10, 1997.

(Continued)

*Primary Examiner*—Naoko Slack
(74) *Attorney, Agent, or Firm*—Craig K. Leon (57) ABSTRACT

The invention provides methods, systems, and devices for installing thermal barriers in openings or gaps in or between structures such as walls, ceilings, and floors. At least one thermal barrier molding bag is positioned in the hole or gap, and a flowable firestop material that is operative to cure or harden, such as a hydratable cementitious slurry, is introduced into the bag to mold a barrier in the hole or gap.

6 Claims, 10 Drawing Sheets

U.S. PATENT DOCUMENTS

| | | | |
|---|---|---|---|
| 4,136,208 A * | 1/1979 | Light et al. ............... 426/538 |
| 4,155,208 A | 5/1979 | Shanabarger |
| 4,172,345 A | 10/1979 | Alderman |
| 4,172,915 A | 10/1979 | Sheptak et al. |
| 4,182,085 A | 1/1980 | Elson |
| 4,312,279 A | 1/1982 | Wilson et al. |
| 4,399,645 A | 8/1983 | Murphy et al. |
| 4,583,565 A | 4/1986 | Cornwall |
| 4,638,829 A | 1/1987 | Cornwall |
| 4,724,858 A | 2/1988 | Cornwall |
| 4,726,974 A * | 2/1988 | Nowobilski et al. ......... 428/69 |
| 4,871,477 A | 10/1989 | Dimanshteyn |
| 4,878,481 A | 11/1989 | Schoeff et al. |
| 4,884,381 A | 12/1989 | Betti |
| 5,035,951 A | 7/1991 | Dimanshteyn |
| 5,076,309 A | 12/1991 | Cornwall |
| 5,127,203 A | 7/1992 | Paquette |
| 5,127,425 A | 7/1992 | Cornwall |
| 5,127,760 A | 7/1992 | Brady |
| 5,129,201 A | 7/1992 | Robertson et al. |
| 5,155,957 A | 10/1992 | Robertson et al. |
| 5,180,063 A | 1/1993 | Sakno |
| 5,183,070 A | 2/1993 | Cornwall |
| 5,340,612 A | 8/1994 | Perito |
| 5,356,446 A | 10/1994 | Smetana et al. |
| 5,384,188 A | 1/1995 | Lebold et al. |
| 5,390,465 A | 2/1995 | Rajecki |
| 5,391,347 A | 2/1995 | Bastide et al. |
| 5,401,538 A | 3/1995 | Perito |
| 5,417,019 A | 5/1995 | Marshall et al. |
| 5,452,551 A | 9/1995 | Charland et al. |
| 5,456,050 A | 10/1995 | Ward |
| 5,471,805 A | 12/1995 | Becker |
| 5,482,686 A | 1/1996 | Lebold et al. |
| 5,498,466 A | 3/1996 | Navarro et al. |
| 5,508,321 A | 4/1996 | Brebner |
| 5,548,934 A | 8/1996 | Israelson |
| 5,578,671 A | 11/1996 | Welna |
| 5,634,304 A | 6/1997 | Sackno |
| 5,655,350 A | 8/1997 | Patton |
| 5,656,117 A | 8/1997 | Wood, et al. |
| 5,664,396 A * | 9/1997 | Lyman et al. ............... 52/788.1 |
| 5,702,218 A | 12/1997 | Onofrio |
| 5,744,199 A | 4/1998 | Joffre et al. |
| 5,887,395 A | 3/1999 | Navarro et al. |
| 5,890,245 A * | 4/1999 | Klearman et al. ............. 5/714 |
| 6,051,193 A | 4/2000 | Langer et al. |
| 6,161,564 A | 12/2000 | Cornwall |
| 6,176,053 B1 | 1/2001 | Germain |
| 6,189,277 B1 | 2/2001 | Boscamp |
| 6,224,835 B1 * | 5/2001 | Langer ....................... 422/179 |
| 6,458,418 B1 * | 10/2002 | Langer et al. ............ 427/376.1 |
| 6,572,948 B1 * | 6/2003 | Dykhoff ...................... 428/76 |
| 6,698,146 B1 * | 3/2004 | Morgan et al. ............... 52/232 |
| 6,789,702 B1 * | 9/2004 | O'Connor et al. ............ 222/96 |

FOREIGN PATENT DOCUMENTS

| | | |
|---|---|---|
| JP | 11117435 | 4/1999 |
| JP | 200297489 | 10/2002 |
| WO | 88/08790 | 11/1988 |

OTHER PUBLICATIONS

ASTM, "Standard Test Method for Fire-Resistive Joint Systems", Sep. 10, 1999.

Underwriters Laboratories Inc., "UL Standard for Safety for Tests for Fire Resistance of Building Join Systems", Jul. 31, 1998.

Grace Construction Products, "Firestop Specification", prior to Oct. 1, 2001.

Grace Construction Products, "Flamesafe 3000 Elastomeric Spray", May, 2000.

Grace Construction Products, "Head of Wall Systems", 2001.

* cited by examiner

IN SITU MOLDED THERMAL BARRIERS

This is a division, of application Ser. No. 09/999,307, filed Oct. 31, 2001, now U.S. Pat. No. 6,698,146.

FIELD OF THE INVENTION

The present invention relates to building structures, and more particularly to moldable thermal barriers for "head-of-wall" joint assemblies between top of walls and ceilings, "perimeter" joints between floors and vertical walls, and other joints, gaps, or holes in building structures.

BACKGROUND OF THE INVENTION

Firestops are thermal barrier materials or combinations of materials used for filling gaps and openings such as in the joints between fire-rated walls and/or floors of buildings. For example, firestops can be used in walls or floors to prevent fire and smoke from passing through the gaps or openings required for cables, pipes, ducts, or other conduits. Firestops are also used to fill joint gaps that occur between walls, between a ceiling and the top of a wall ("head-of-wall" joints), and between a floor and vertical wall ("perimeter" joints).

So-called "head-of-wall" joints pose a number of challenges for the firestopping industry. Walls are increasingly being made of gypsum wallboard affixed to a framework of metal studs capped by a horizontally extending track. Ceilings are increasingly being made by pouring concrete onto fluted steel. Although the distance between the horizontally extending track at the top of the wall is often fixed in relationship to the ceiling, the gypsum wallboards are subject to expansion and contraction due to motion of other building components, ground settling, or other causes.

For such head-of-wall joints, it is known to use mineral wool batt as a thermal resistant firestop material due to its ability to provide for cyclic movements in the wallboard material. The mineral wool is cut into separate sheets that are appropriately sized depending on the specific geometry of the fluted steel ceiling. The sheets need to be stacked and compressed (e.g., a minimum 50%) when packed into the joint gap. In some situations, a fireproofing material is spray-applied into the spaces of the fluted ceiling to supplement the mineral wool in the joint. In either case, the mineral wool approach requires labor and time.

After packing of the mineral wool batt into place above the wall, the construction worker must then spray an elastomeric coating, using a minimum one-eighth inch thickness, against the exposed side surfaces of the compressed mineral wool layers. The coating must overlap a minimum of one half inch onto the ceiling and wall surfaces. Thus, the use of mineral wool batt and elastomeric spray coating provides for the ability of the resultant firestop to accommodate some cyclic movement (compression and extension) in various components such as the gypsum wallboards on either side of the head-of-wall joint.

So-called "perimeter barrier" systems also typically employ mineral wool and elastomeric coating as firestopping material in the joint gaps between floors and the surface of a wall, which could be an interior partition or an external wall. In this case, the mineral wool batt must be packed tightly in the gap, to improve its fire resistance, and so that upon expansion of the gap due to shrinkage of the floor or movement of the wall, the mineral wool does not fall out of the gap and into the floor level below. An elastomeric spray coating is then applied onto the top face of the packed mineral wool batt, but in most cases the bottom of the mineral wool batt is not coated. This is often due to the fact that the wool batt must be accessed from below, requiring that ladders and spray equipment be moved downstairs and set up.

One objective of the present invention is to provide a more convenient and cost-effective method for installing a thermal barrier in intricately shaped openings and joint gaps such as are found in "head-of-wall" joints, "perimeter" joints, and other variously sized and/or intricately shaped gaps or openings such as penetrations through walls. For example, openings having plastic pipes or plastic-coated wires often require an intumescent firestopping material for sealing the space left by the plastic material after it has melted in the fire. Sometimes an intumescent caulk material is inserted into such penetration openings. In the case of larger diameter pipes, a metal collar is used to retain the caulk in place. In other cases, wrapped or bagged mineral wool with an intumscent material is inserted into the hole. In any case, installation of such firestopping is time-consuming and expensive.

Another objective of the invention is to provide novel thermal barriers that may be used conveniently and safely in hard-to-reach building or ship vessel joint gaps or holes. For example, the location of a head-of-wall joint next to an elevator shaft or crawl space would render difficult the installation of mineral wool/coating systems, because the task of coating both sides would be complicated by the lack of convenient access.

A still further objective of the invention is to enhance safety of installation. An applicator must climb up and down ladders on a frequent basis when working on head-of-wall joint assemblies. In the first instance, there is the fitting and hand-packing of mineral wool material into the joint gap. In the second instance, there is the coating of elastomeric material to create a continuous surface between the ceiling, firestop, and wall. In both cases, the ladder may require frequent repositioning, and this is especially the case where joint gaps extend lengthy distances of ten to twenty feet or more. Frequent climbing up and down ladders would also be required in "perimeter barrier" systems if it were desired to apply an elastomeric coating onto the bottom face of a mineral wool firestop that has been packed between a floor and a wall, because the installer would need to go to the floor below the firestop to coat the bottom face of the mineral wool material.

In view of the prior art disadvantages, novel thermal barriers and methods are believed to be needed.

SUMMARY OF THE INVENTION

In surmounting the disadvantages of the prior art, the present invention provides a method and system for installing a thermal barrier in openings and gaps in or between building structures such as walls, ceilings, and floors. In so doing, the present invention provides increased convenience, effectiveness, and safety in comparison to the prior art mineral wool/coating methods. The thermal barriers of the present invention have the ability to conform intimately with openings and gap spaces of various sizes and shapes. The thermal barriers also have the ability to permit movement of the various building structures around the openings or gaps. In particular, protection on both sides of "head-of-wall" joint assemblies (arising between a wall and ceiling) as well as upper and downward faces of "perimeter barrier" assemblies (arising between a floor and wall) may be conveniently accomplished by the thermal barriers and methods of the present invention.

An exemplary method of the present invention comprises providing a first structure (e.g., building or ship structure such as a floor, wall, or ceiling) having an opening (such as a hole for passage or access to cables, wires, pipes, ducts, electrical panels, etc., or providing first and second structures which define therebetween a gap (such as the joint gap between a wall and a ceiling or floor); introducing into the opening or gap at least one (empty) thermal barrier molding bag that is operative to receive and substantially to contain a flowable firestop material, one that is preferably operative to harden within the bag; and introducing into the thermal barrier molding bag a flowable firestop material to expand the bag within the hold or joint gap, thereby molding a thermal barrier within the hole or joint gap.

Exemplary thermal barrier molding bags of the invention are preferably made of thermoplastic film material (although other suitable materials are hereinafter described) and preferably have at least two or more openings, preferably of the type that can be opened and closed more than once, that permit introduction into the bag of a flowable firestop material, e.g., such as hydratable cementitious slurry, an intumescent material, a superabsorbent polymer; polyurethane (foam); hydrated silica gel; inorganic dessicants (e.g., molecular sieves such as zeolites; silica gel; calcium oxide; calcium sulfate; calcium chloride; barium oxide; phosphorous pentoxide); fibers; mineral wool; fiber glass; or mixture thereof. The molding bag material should be sufficiently sized and shaped, and flexible enough to permit expansion of the molding bag, upon introduction of the flowable firestop material, and to permit molding of a thermal barrier within at least a portion of the opening or joint gap. Preferably, the bags are flexible enough to permit them to be transported in a compact rolled form (when empty) and unrolled into place in the opening or gap space (wherein they are expanded and filled with the flowable firestop material).

Firestop barriers made in accordance with the above-described in-situ methods of the present invention provide excellent fire resistance and sealing ability as well as smoke and acoustic barrier properties. They are also sufficiently strong to resist dislodgement from the gap or opening due to pressure (e.g., force from a water hose) and are highly amenable to visual inspection.

Further features and advantages of the invention are described in detail hereinafter.

BRIEF DESCRIPTION OF THE DRAWINGS

The following detailed description of exemplary embodiments may be more readily appreciated in conjunction with appended drawings, wherein.

DETAILED DESCRIPTION OF EXEMPLARY EMBODIMENTS

The present invention employs one or more thermal barrier molding bags that may be conveniently placed in openings in structure, such as a wall, ceiling, or floor, or conveniently placed in gaps such as are defined in the joints between walls, ceilings, and/or floors. The molding bags are placed empty in the hole or gap, and a flowable firestop material is introduced into the molding bag, thereby expanding the bag to fill the space within the hole or gap, and the flowable firestop material is then allowed to harden within the hold or gap to provide a strong thermal barrier.

Figure 1:
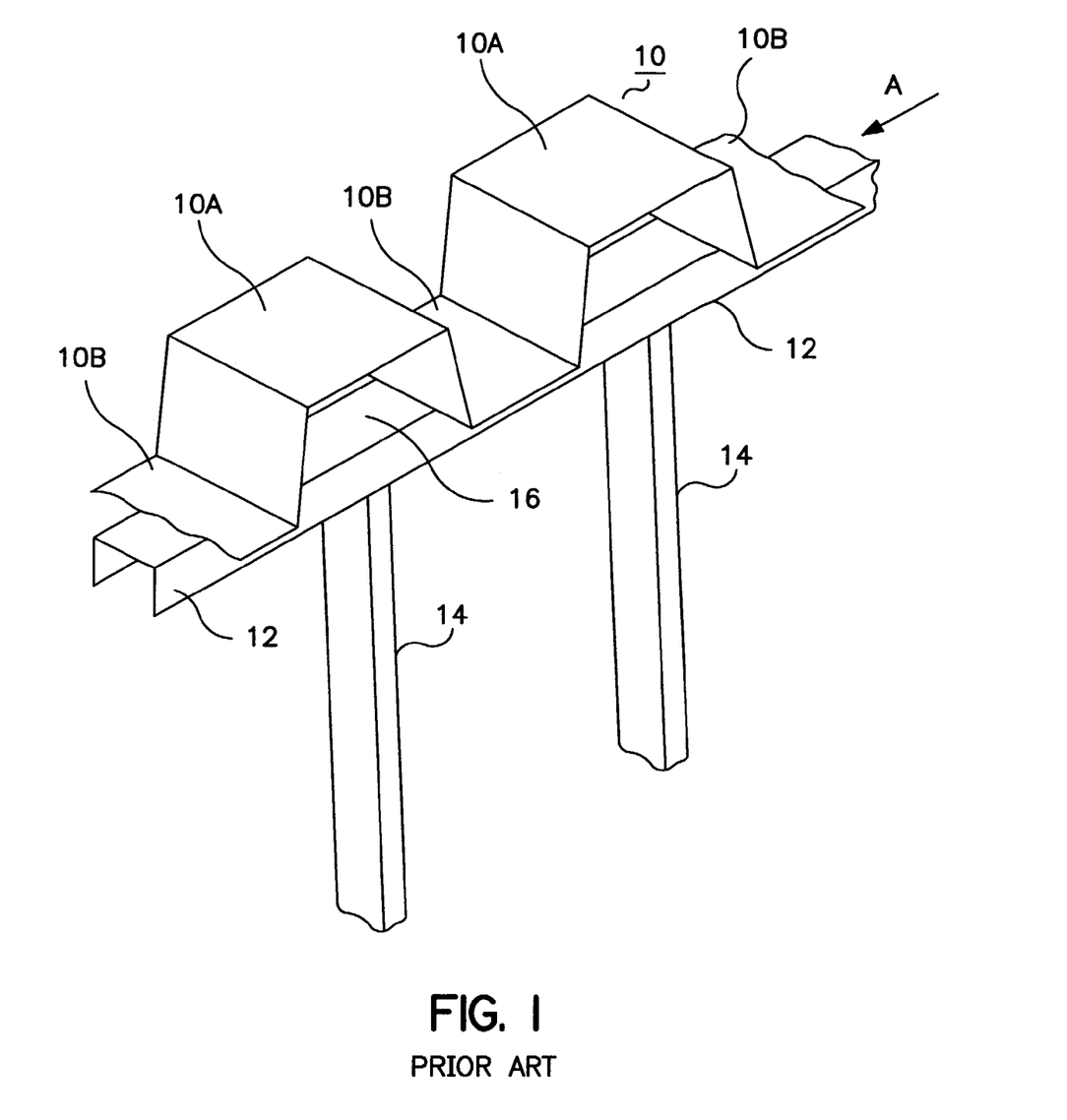
FIG. 1 is a perspective diagram of a so-called "head-of-wall" joint assembly (PRIOR ART)
Figure 2:
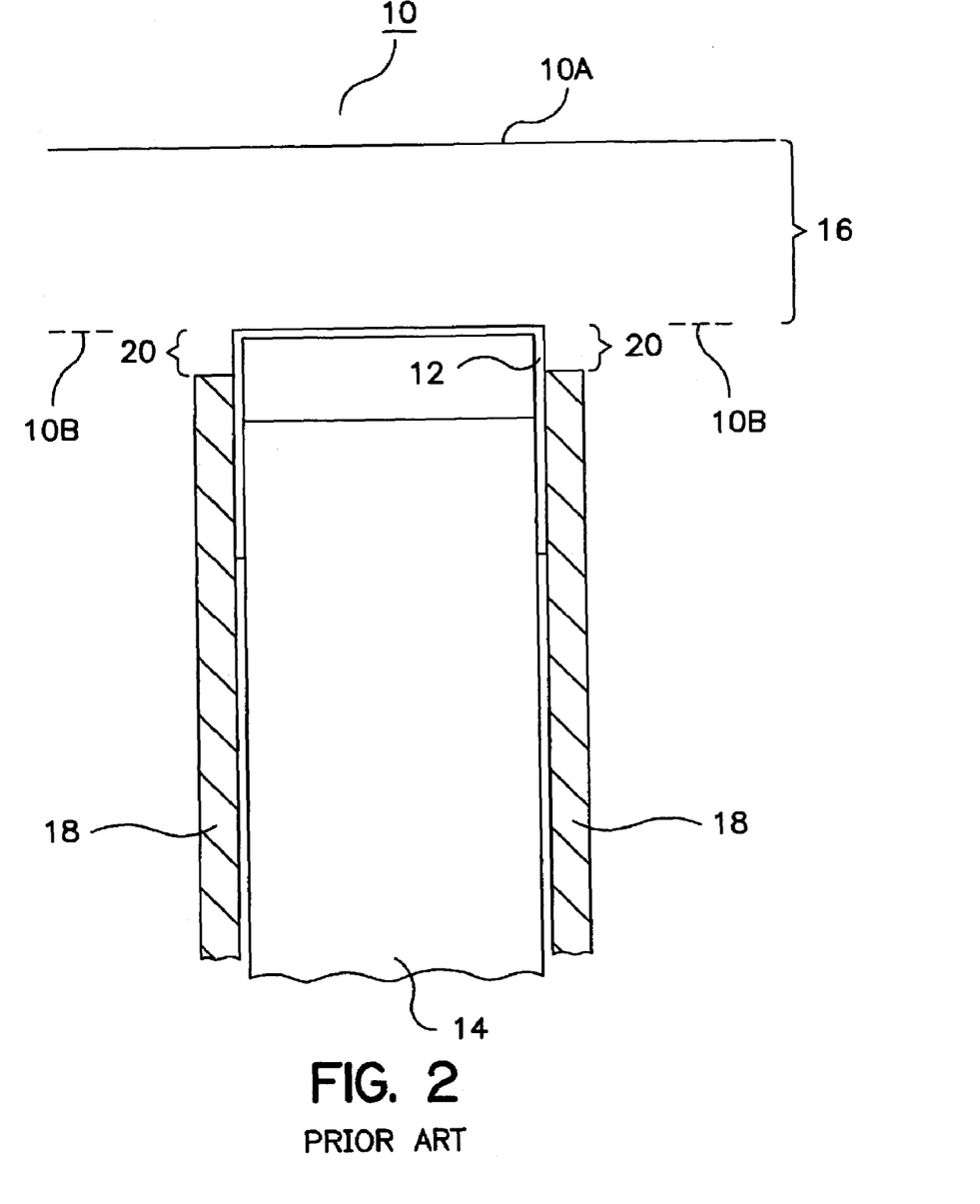
FIG. 2 is a diagram of "head-of-wall" joint assembly along view in direction of arrow "A" shown in FIG. 1.

As shown in FIG. 1, a "head-of-wall" joint gap appears between the top of a vertical wall and ceiling (PRIOR ART). In this case, the wall is made by attaching a horizontal metal track 12 or runner to a fluted metal ceiling 10 which runs in a perpendicular manner to the wall (12). The ceiling 10 has fluted portions 10B which are somewhat lower than the top ceiling portion 10A, and thus a joint cavity 16 is defined between the top ceiling portion 10B and the top of the wall, which in this case is the horizontal track 12. Metal studs 14 are attached to the horizontal track 12 and connected to the floor below. As shown in FIG. 2, gypsum wallboards 18 are affixed on either side of the studs 14 to complete the wall assembly (PRIOR ART), and gaps 20 are typically left between the tops of the wallboard 18 and horizontal track 12 to permit movement of the wallboards 18.

Figure 3:
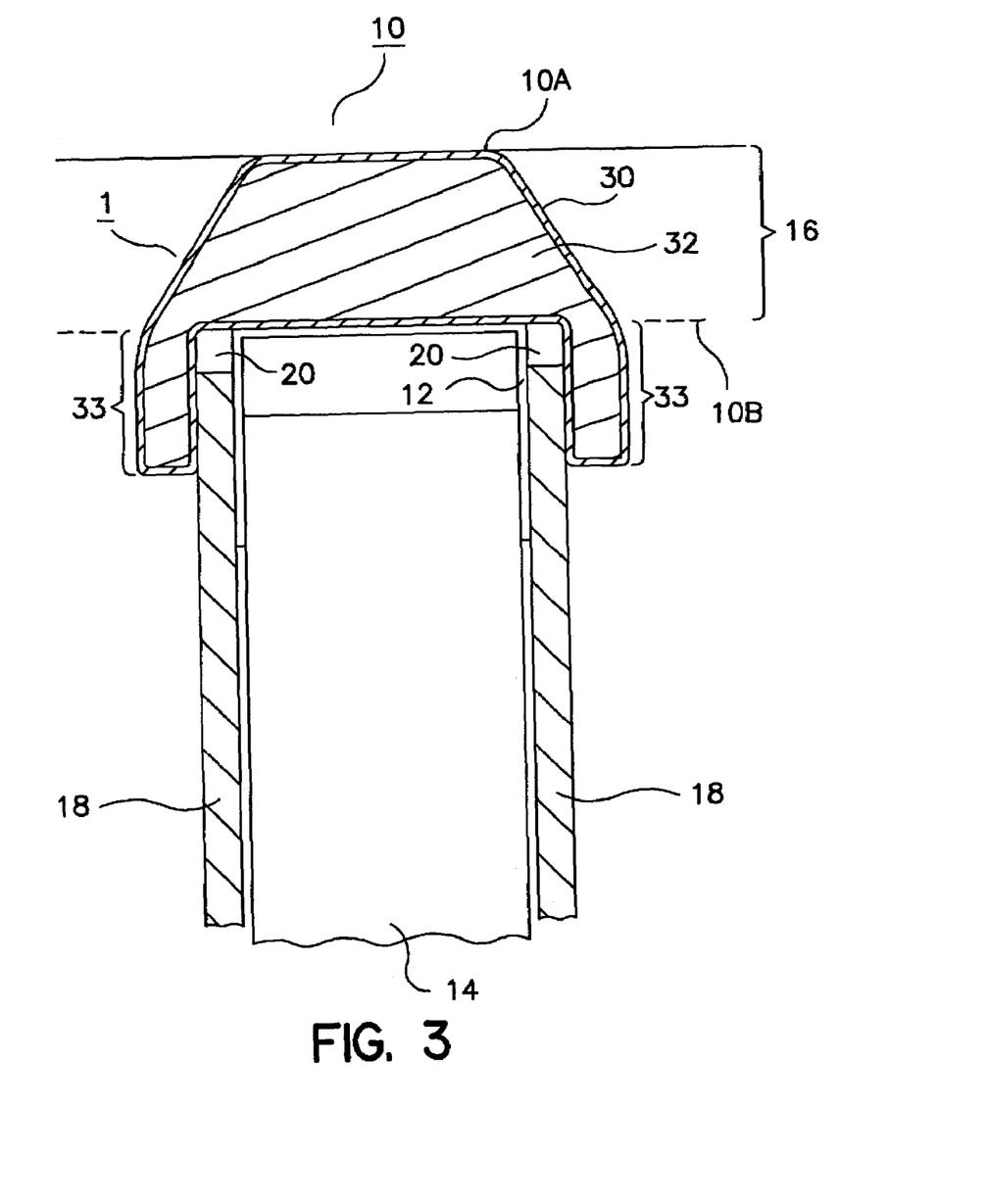
FIGS. 3 and 4 are diagrams of exemplary thermal barriers of the present invention.

As shown in FIG. 3, an exemplary thermal barrier 1 of the invention is made by inserting an empty thermal barrier molding bag 30 between the horizontal track 12 and bottom surface 10B of the fluted metal ceiling 10, before the track 12 is attached to or otherwise fixed into place against the ceiling surface 10B. A flowable firestop material 32 is then introduced into the molding bag 30 to fill the joint space 16. Preferably, the thermal barrier molding bag 30 has portion 33 thereof extending below the tops of the gypsum wallboards 18 on either side of the wall (12/14/18) to protect the exposed gap 20 next to the horizontal track 12, so that heat and smoke do not penetrate through the wall at the top portion which is not covered by the gypsum wallboard 18.

Preferably, a spacer material (e.g., resiliently compressible strip of foam (STYROFOAM type), foamed rubber, expanded polystyrene, mineral wool, air balloon, etc.) is inserted at the corner gaps 20, to leave a space for cyclic movement of the wallboards 19 when the flowable firestop material 32 is hardened.

Figure 4:
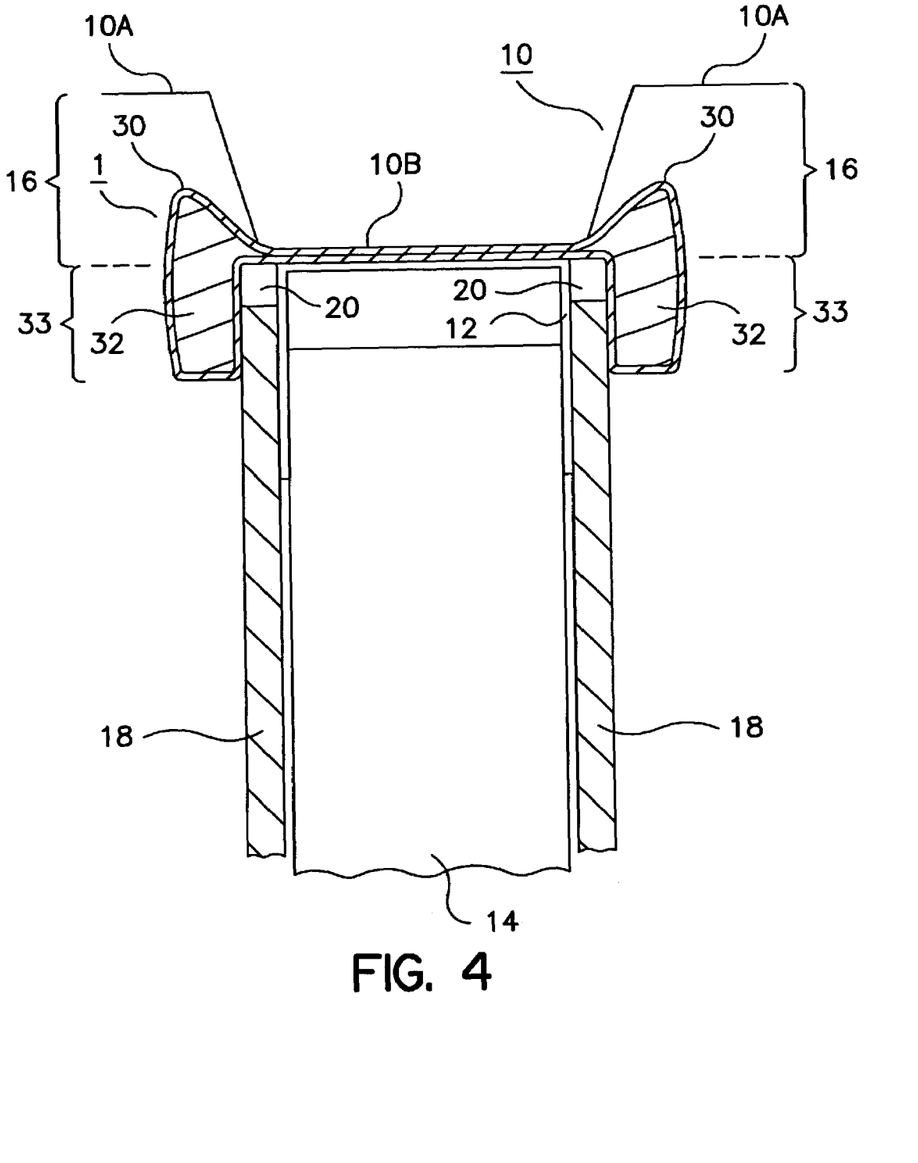

As shown in FIG. 4, another exemplary thermal barrier 1 of the invention can be made when the fluted metal ceiling 10 is oriented in the same direction as the metal stud wall 14. In this case, a barrier molding bag 30 is positioned between the horizontal track 12 and ceiling surface 10B, with longitudinal edges of the bag (33) extending outwards on either side of the joint between the wall and ceiling, before the horizontal track 12 is attached to (or otherwise disposed against) the ceiling surface 10B. While no joint cavity therefore appears on top of the wall in this case (because the spaces defined between ceiling surfaces 10A and 10B appear on either side of the wall), the corner gaps 20 which are customarily left at the top of the gypsum wall board 18 nevertheless render the horizontal extending track 12 unprotected against fire. Therefore, a flowable firestop material 32 is introduced into the molding bag 30, such that a thermal firestop barrier is molded along the joint over the corner gaps 20 at the top of the gypsum boards 18. Again, it is preferable that a spacer material (foam or mineral wool strip) be inserted into the gap spaces 20 to permit movement of the boards 18.

Thus, an exemplary method of the invention comprises inserting a thermal barrier molding bag 30 in the joint between two structures, such as a wall and ceiling, and introducing a flowable firestop material into the bag 30 so as to expand the bag 30 from an empty shape to a shape conforming to the space between or around the two structures, and allowing the firestop material to harden inside the bag 30, whereby a thermal barrier 1 is molded.

The thermal barriers of the invention are contemplated primarily for use in joint assemblies (e.g., floor-to-floor joint systems, wall-to-wall joint systems, floor-to-wall joint systems, and head-of-wall joint systems) as well as in "penetration" holes (e.g., passageways in which pipes, wires, cables, ducts, electrical panels, meters, and other conduits or devices, are situated).

As shown in FIGS. 3 and 4, the positioned molding bag 30 is filled with a flowable firestop material 32 that is operative to harden within the bag 30, such as a hydratable cementitious slurry. The molding bag 30 or bags should allow the introduced flowable firestop material 32 to fill the hole or gap space completely, thereby providing an effective barrier against passage by heat and smoke. Although FIGS. 3 and 4 depict an application for sealing a joint defined between and/or along two structures, it will be understood that the exemplary method and bag device can be used for filing or otherwise protecting variously sized and shaped holes in one structure or the joint gaps between two or more structures. Two or more bags 30 can be used in concert in large holes or joint gaps, such as by overlapping ends of bags, stacking the bags, or abutting two or more bags in an end-to-end configuration.

Exemplary molding bags 30 of the invention may be fabricated as one piece "tubes" or sleeves that may be sealed or otherwise closed at the ends to form a container. More preferably, the bags 30 are made by heat sealing, sewing, adhering, or welding two or more sheets or films together. The films or sheets may be made of different materials. For example, plastic sheets having different moduli of elasticity (Young's) can be used. For example, a highly elastic polymer film can be used for the purpose of allowing the bag to expand into the space of a hole or cavity.

Figure 5:
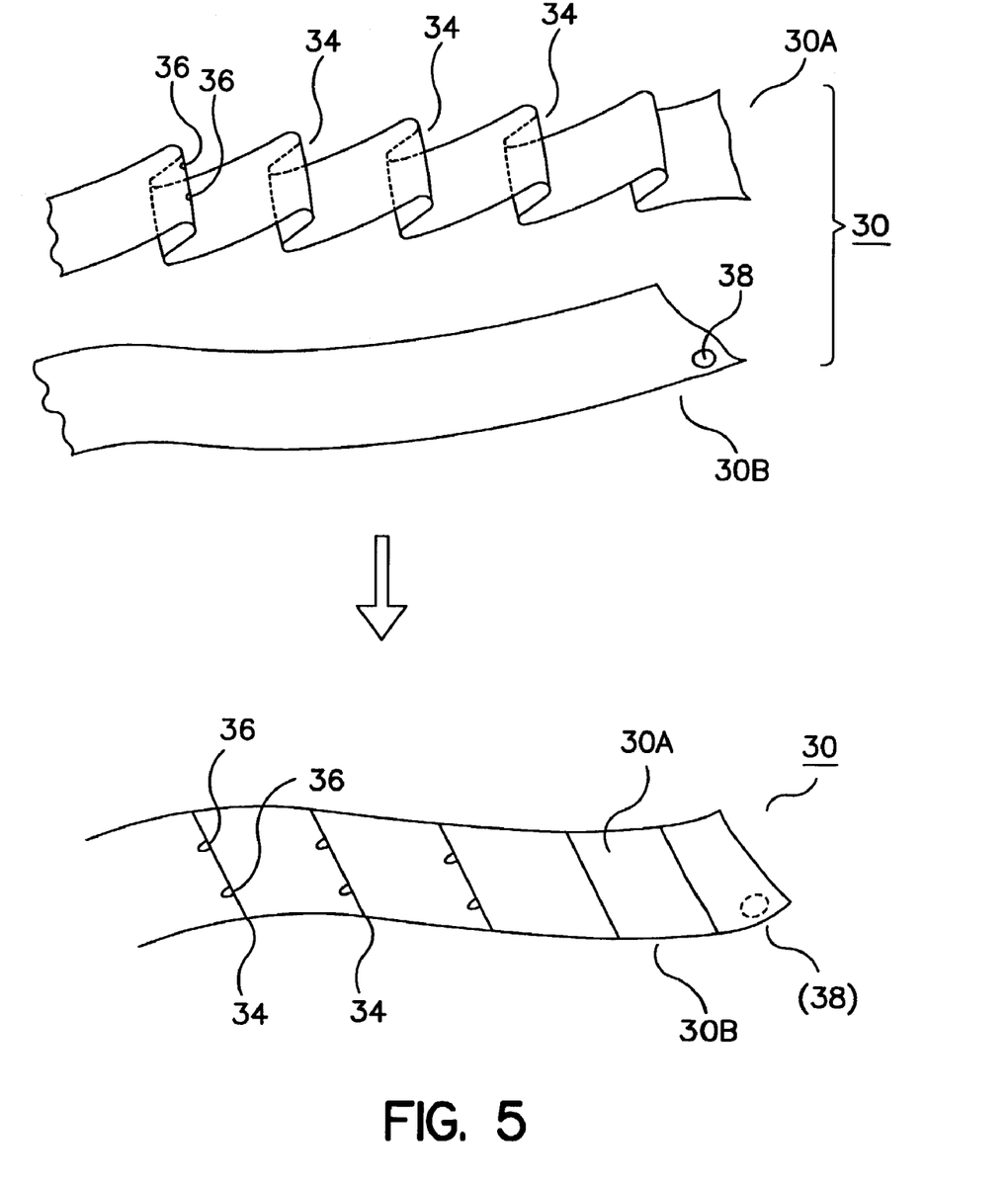
FIG. 5 is a diagram of exemplary components of an exemplary thermal barrier molding bag having pleats.

As shown in FIG. 5, another exemplary thermal barrier molding bag 30 of the invention can be made using two separate sheets or films 30A and 30B. The exemplary sheet or film component designated as 30A, which in this case is designed to facilitate expansion of the molding bag 30 into the joint cavities (designated at 16 in FIGS. 1–3), comprises one or more pleats 34 made by folding the material. The folded top sheet or film 30A is then seamed (such as by welding or sewing) to the bottom sheet or film 30B to obtain the molding bag 30. Preferably, the top film 30A has one or more air evacuation holes 36 to permit air to evacuate the bag 30 when flowable firestop material is introduced. An exemplary closeable inlet 38 is illustrated in the top portion of FIG. 5, which is designed to permit the flowable firestop material to be introduced into the bag when it is positioned in the hole or joint.

The bottom sheet or film 30B, as shown in FIG. 5, can therefore be made of material having a higher modulus of elasticity in comparison with the top sheet or film 30A. One reason for using a stronger or more rigid material for the bottom film 30B is that doing so may be more suitable for the purposes of attaching one or more closeable inlets 38. Another reason is that the bottom face 30B may be sufficiently rigid to retain a fold or arch around the corner gaps 20 shown in FIGS. 2–4. In further exemplary embodiments, a flashing material, such as a rigid plastic or metal sheet can be adhered to the bottom face 30B when the bag 30 is installed on top of the wall, with corners bent to coincide with the corner gaps 20, thereby to resist the weight of the bag 30 and firestop material 32.

Figure 6:
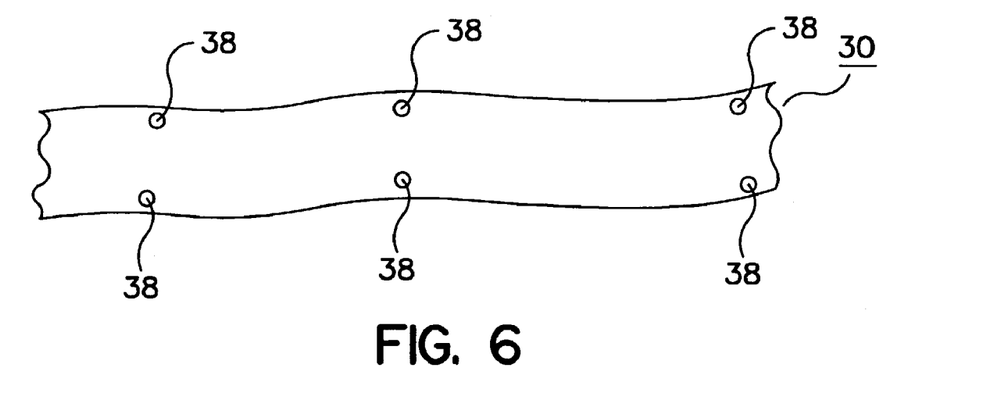
FIG. 6 is a diagram of another exemplary thermal barrier molding bag having exemplary inlets for introducing a flowable firestop material.

As shown in FIG. 6, another exemplary thermal barrier molding bag 30 of the invention has at least two inlets 38 for introducing flowable firestop material into the bag 30 while the bag is situated in a hole or joint. Preferably, the inlets 38 are disposed along both longitudinal edges of the bag 30 (on either top or bottom sheets or films), so that when the bag is installed on top of a wall in a "head-of-wall" joint assembly, an installer can introduce a flowable firestop material into the bag from either side of the wall.

Exemplary flowable firestop materials 32 contemplated for use in the present invention are preferably of the type which are operative to cure or harden inside the bag 30. The term "flowable" as used herein means and includes both dry and liquid materials, and preferably refers to materials that can be pumped under positive pressure through a hose. For example, dry flowable firestop materials can include fibers, such as mineral wool fibers, expanded vermiculite, expanded perlite, shredded expanded polystyrene, clay granules or prills, and the like, optionally with a binder material, such as a latex, a cement and/or gypsum slurry. Exemplary liquid flowable firestop materials can include hydratable cementitious materials, as further explained below, as well as synthetic polymers (e.g., polyurethane, polyvinyl chloride, polyvinylidene chloride) preferably containing inorganic fillers to reduce flammability (e.g., sand, clay).

The term "hydratable cementitious" material as used herein refers to material that comprises at least one cementitious binder that begins to harden when mixed with water. Such a binder may be Portland cement, masonry cement, or mortar cement, gypsum, stucco, Plaster of Paris, aluminous cement, pozzolanic cement, magnesium oxychloride, magnesium oxysulfate, calcium silicate-hemihydrate, as well as materials such as limestone, hydrated lime, fly ash, blast furnace slag, and silica fume. The hydratable cementitious materials may in addition optionally include fine aggregates (e.g., sand), coarse aggregates (e.g., crushed stone, gravel, carbon flakes), or other fillers. Further exemplary cementitious materials may optionally contain, in addition to the cementitious binder, an intumescent material as will be further described hereinafter.

Preferred cementitious materials include pumpable cement and/or gypsum slurries of the kind now employed in the spray-applied fireproofing industry. Portland cement slurries, optionally having gypsum, are especially preferred. Other suitable fireproofing compositions are disclosed in U.S. Pat. No. 4,699,822 of Shu; U.S. Pat. No. 4,751,024 of Shu; U.S. Pat. No. 4,904,503 of Conroy, Hilton, Korenberg; U.S. Pat. No. 4,934,596 of Driscoll, Hilton; U.S. Pat. No. 5,352,490 of Hilton, Korenberg; U.S. Pat. Nos. 5,340,612 and 5,401,538 of Perito; U.S. Pat. No. 5,556,576 of Berneburg, Freitas, Pisaturo; and U.S. Pat. No. 6,162,288 of Kindt, Hilton, Perito. Such cementitious slurries are pumpable, because they are typically used in conventional spray applications, and would permit the thermal barrier molding bags 30 to be filled rapidly. While such formulations may involve the use of fibers, aggregates, and fillers, these would be rendered optional in the present invention because the molding bag 30 would serve primarily as the means for maintaining the integrity and shape of the cementitious slurry until it hardens.

Exemplary hydratable cementitious materials used as flowable firestop materials 32 in the present invention may further include one or more admixtures or additives, such as set accelerators, set retarders, water reducers (including superplasticizers and fluidity enhancing agents), rheology modifiers, air entraining agents, pigments or colorants, porous aggregates (e.g., shredded expanded polystyrene, expanded vermiculite, perlite, etc.), fibers, rheopectic agents (e.g., granular attapulgite, sepiolite, or mixtures thereof), surfactants, and other admixtures as conventionally known in the art.

Exemplary flowable firestop materials 32 may also comprise intumescent compositions which are known in the fireproofing art. Upon exposure to fire, heat, or flames, such intumescent compositions, as their name implies, expand considerably in terms of thickness to produce an insulative layer of char and char foam.

Numerous patents and publications have disclosed intumescent compositions containing one or more polymeric materials in combination with phosphate-containing materials and carbonific or carbon-yielding materials, and such compositions, as known in the art, are believed to be suitable for use as flowable firestop materials 30 of the present invention. See e.g., U.S. Pat. No. 3,513,114 of Hahn et al.; U.S. Pat. No. 5,487,946 of McGinniss et al.; U.S. Pat. No. 5,591,791 of Deogon; U.S. Pat. No. 5,723,515 of Gottfried; World Patent No. WO 94/17142 (PCT/US94/00643) of Buckingham; and World Patent No. WO 98/04639 (PCT/US96/12568) of Janci, all of which are incorporated fully herein by reference. In U.S. Pat. No. 3,513,114 assigned to Monsanto, Hahn et al. disclosed intumescent compositions comprising an aqueous dispersion of a polyvinyl acetate-containing emulsion, a solvent plasticizer, and carbonific ammonium polyphosphates. In U.S. Pat. No. 5,723,515 of Gottfried, it was taught to incorporate an elasticity agent such as vermiculite, perlite, elastomerics, and acrylics, to increase resistance of the intumescent coating to cracking and shrinking and to improve ease of spraying.

Another intumescent composition, which the inventors believe is suitable for use as a flowable firestop material 32 in the present invention, is disclosed in World Patent Application of Lawrence L. Kuo et al., PCT/US00/18887, which disclosed a composition comprising a component package for providing a char and char foam; a polymeric binder in emulsion form operative to form a film when the composition was allowed to dry; and a crack control agent having a total of 3 to 6 carbons and a boiling point in the range of 75–175° C., the crack control agent being represented by the structural formula $R^2$—O—$CH_2$—$C(R^1)H$—O—$R^3$ wherein $R^1$=—H or —$CH_3$; and $R^2$ and $R^3$ independently comprise —H, —$R^4$, or —$COCH_3$, wherein $R^4$ comprises a $C_1$–$C_3$ alkyl group. A preferred crack control agent of Kuo et al. comprises alkoxy glycol ether, alkoxy glycol acetate, alkoxy glycol ether acetate, or mixtures thereof. An exemplary surfactant package comprises a nonionic alkylaryl polyether alcohol having general formula R—($OCH_2CH_2)_xOH$, wherein R is a $C_4$–$C_8$ alkyl group (most preferably, a branched octyl group), represents a phenylene group, and "x" represents an integer, preferably in the range of 15–100. Preferred surfactant packages may further comprise a dispersant, such as a polyacrylic acid or its salt (e.g., sodium polyacrylate) or derivatives.

Other exemplary intumescent materials include graphite flakes impregnated with sulfuric or nitric acids. Inorganic material flakes capable of exfoliation when heated include vermiculite and perlite.

Intumscent materials can be used in combination with other flowable firestop materials 32 in the invention such as Portland cement and/or gypsum containing slurries. For example, in U.S. Pat. No. 5,395,571 of Symons, there was disclosed a combination involving gypsum and thermoset resin. Thus, a composition can be made by combining (a) an inorganic base material selected from the group consisting of a calcium sulfate hemi-hydrate, magnesium oxychloride, magnesium oxysulphate and a hydraulic cement; (b) a thermosetting resin which is miscible, soluble or dispersible in water; (c) a suitable amount of a catalyst for the thermosetting resin; (d) water in an amount sufficient to rehydrate the inorganic base material with the water present in the other components; (e) optionally a plasticizer such as a melamine formaldehyde condensate; (f) optionally polyvinyl alcohol; (g) optionally a retarder for retarding the setting time of the inorganic base material; (h) optionally a fibrous reinforcing material; and (i) a foam or a foaming agent. Thus, exemplary flowable firestop materials of the invention may comprise a hydraulic cementitious slurry containing a portion (e.g., 1–90%) by weight of a polymer, resin, and/or intumescent material, as generally known in the art.

Exemplary flowable fireproofing materials 32 used in the invention, such as hydratable cementitious slurries, should preferably contain biocidal agents to combat growth of mold, fungi, and bacteria. These may be supplied in dry powder or liquid form. Materials which remain wet for long periods of time may be susceptible to mold growth, and thus mold inhibitors should preferably be incorporated into the flowable fireproofing material especially if it is an aqueous medium such as a cementitious slurry. Effective mold inhibition additives include zinc dimethyldithiocarbamate; 1,3 benzenedicarbonitrile; 2,3,5,6-tetrachlorothiabendazole; 5-chloro-2-methyl-4-isothiazolin-3-one and 2-methyl-4-isothiazolin-3-one; 2,3,5,6-1,3-di(hydroxymethyl)-5,5-dimethylhydantion, or diiodomethyl-p-tolyl sulfone. More general biocides, such as sodium hypochlorite or sodium orthophenylphenate tetrahydrate, inhibit bacteria as well as molds. For some applications, it is important to use a biocide with minimal toxicity to humans.

Further exemplary flowable firestop materials 32 may comprise superabsorbent polymers, either alone or in combination with, for example, a hydratable cementitious slurry. A superabsorbent polymer is generally a cross-linked, hydrophilic polymer that is operative to bind water and hence to provide a degree of fire or thermal barrier protection. Examples of superabsorbent materials include hydrolyzed maleic anhydride polymers and copolymers including copolymers with vinyl ethers, styrenes, ethylene, and other olefins, polyvinylpyrrolidone, sulfonated polystyrene, polysulfethyl acrylate, poly(2-hydroxyethylacrylate), polyacrylamide, poly(acrylic acid) and alkali metal salts thereof, poly(acrylic acid alkali metal salt), starch modified polyacrylic acid and alkali metal salts thereof, poly(starch modified acrylic acid alkali metal salt), hydrolyzed polyacrylonitrile and alkali metal salts thereof, poly(hydrolyzed polyacrylonitrile alkali metal salt), poly(vinyl alcohol acrylic acid alkali metal salt), salts thereof and mixtures thereof. Other options for superabsorbent material include poly(acrylic acid alkali metal salt) such as poly(sodium acrylate), polyhydroxyalkyl acrylates and methacrylates, polyvinyl lactams, polyvinyl alcohols, polyoxyalkylenes, natural or synthetically modified polysaccharides, proteins, alginates, xanthum gums, guar gums, and cellulosics. Other examples include monovalent and polyvalent inorganic and organic salts of the foregoing polymers comprising acidic or basic functional groups. Alkali metal salts are preferred for acid functional polymers.

Exemplary molding bags 30 of the invention, as previously mentioned, should be sufficiently flexible to provide for convenience in positioning the bag, when empty, into opening or gaps of various sizes and shapes, and to provide for expandability in size, upon introduction of the hydratable cementitious material, whereby the molding bag conforms to at least a portion, or the entirety, of the joint gap or opening. Preferably, the bag may be shipped in roll form such that it can be unrolled into place conveniently during installation.

If the molding bag 30 is made of an air-impermeable material such as plastic film, paper, waxed paper, or impregnated woven or nonwoven material (e.g., impregnated spunbonded nonwoven polyolefin such as TYVEK® envelope material) the bag should preferably have one or more air evacuation holes 36 to permit air to escape when the bag 30 is filled with a flowable firestop material 32. The holes should be small enough, however, so that leakage of flowable firestop material 32 is minimal. The holes should be preferably located on an uppermost face (on 30B as shown in FIG. 5 for example) because air will be pushed upwards within the molding bag 30 by the pressure of incoming flowable firestop material 32. While it may be possible to roll the molding bag 30 tightly enough initially to expel the air, the simple act of unrolling the bag is likely to introduce air, thus making it advisable to provide air evacuation holes in the bag.

Exemplary thermal barrier molding bags 30 may comprise a wide range of materials, such as paper, waxed paper, coated paper, cotton, jute, mylar, plastic film, felt, woven fabric, nonwoven fabric (e.g., impregnated spunbonded polyolefin similar to material used in some mailing envelopes), or a combination thereof. Plastic film materials, and in particular thermoplastics such as polyethylene, polypropylene, polyvinyl chloride, or mixtures thereof, are relatively inexpensive and would be convenient to use for the applications contemplated by the inventors. Preferably, the plastic film material is completely or partially transparent, to permit installers and inspectors to ascertain visually whether the molding bag has been filled adequately with the flowable firestop material 32.

Other examplary thermal barrier molding bags 30, which are generally elongate in shape for insertion into extended joint gaps, preferably have markings or other indicia to serve as indicators for helping the installer to align placement of the bag within the joint (e.g., the horizontal track 12 on the top of wall). For example, molding bags 30 can have one or more lines extending longitudinally along the bag to serve as guidelines for positioning the bag correctly on top of a wall. Other exemplary bags 30 may have parallel seams or folds or ridges in the bag that correspond with the edges of the top of the wall (which is usually about two to six inches in thickness if made of gypsum board on metal studs, or about eight inches in thickness if made of mortar blocks).

In further exemplary embodiments, a molding bag 30 can be attached, using adhesive or fasteners, to the horizontal track 12 as a one-piece assembly.

Exemplary thermal barrier molding bags 30 may have wall (face) thicknesses ranging from 0.1 mils to 60 mils or greater depending upon the strength of the film or sheet material employed or the number of films or sheets employed. The molding bags may comprise an elongated tube shape that is sealed closed at opposing ends by adhesive, heat sealing, stitching, clamping, tying (using string or wire), or other means known. The bags may be made by folding over a sheet or film and sealing along peripheral edges to obtain a bag enclosure; or the bag can be obtained by sealing together two separate sheets or films to form the bag. Exemplary molding bags 20 of the invention may therefore have a "pillow shape" suitable for filling extended longitudinally within extended joint gaps, such as the "head-of-wall" joint assemblies and "perimeter barrier" assemblies discussed above. Molding bags of the invention may be made from one layer or two or more layers.

Exemplary molding bags 30 may comprise plastic films reinforced with scrim or mesh, similar to bags which are used for containing meat bones. Such bags are well-known in the food packaging industry and are believed to provide increased strength suitable for present purposes. For example, a polypropylene bag can be reinforced with a fiberglass mesh, which decreases the stretchability of the bag.

Figure 7:
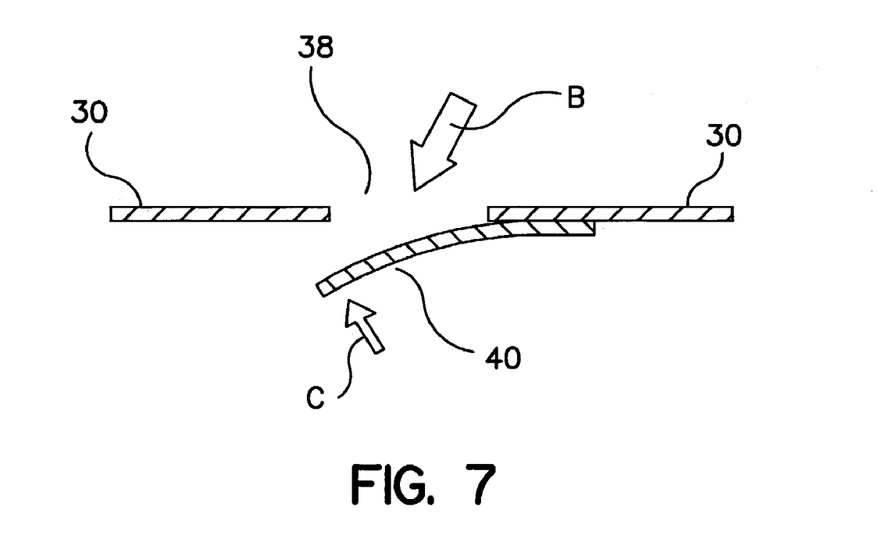
FIG. 7 is a partial diagram of an exemplary inlet for introducing flowable firestop material into a molding bag.

As shown in FIG. 7, an exemplary inlet 38 employs a flap 40 member that is resiliently biased into a closed position against the opening 39 in the bag material. The flap 40 may comprise an elastomer or thermoplastic material, which is partially attached to the inner surface of the bag 30 such as by gluing, hot melt adhesive, sewing, or melt-sealing. The size and shape of the inlet 38 is preferably chosen to correspond with a hose, pipe, or nozzle (not shown) used for conveying a flowable firestop material 32 (e.g., liquid hydratable cementitious slurry) into the bag 30 (shown by the direction of the arrow "B"). In this particular exemplary inlet flap design 28, the pressure of the flowable firestop material 32 in the bag 30 could be used for biasing the flap 40 into a sealing position (shown by the direction of arrow "C") against the inner wall of the molding bag 30. Installers would be able to introduce further flowable firestop material 32 into the bag through the inlet opening 38, and thus the valve 38/40 is preferably closeable, and at least one inlet 38 would be positioned along both longitudinal edges of the molding bag 30, so that when the bag 30 is positioned in correct alignment on top of a vertical wall with both longitudinal edges hanging down on either side of the wall, the inlet openings 38 are conveniently accessible to workers from either side of the wall. In still further exemplary embodiments, the inlet valves 38 can be located towards the center along one or both longitudinally extending edges of the molding bag 30 to minimize the travel distance of flowable firestop material 32 to be introduced into the bag and to increase the likelihood of filling the molding space within the bag as much as possible without leaving air spaces in the hole or joint in which the bag is positioned.

In another exemplary inlet, a screw cap assembly may be employed in a manner similar to the plastic caps on gable-topped orange juice and milk cartons (e.g., waxed cardboard type). It is also possible to employ screw cap assemblies having a directional valve (e.g., rubber flap as shown in FIG. 7). Still further exemplary valves may include ball valves wherein a ball is rotated between a closed position and open position whereby inlet and outlet are connected by a channel running through the ball. Other exemplary valves may include a globe style valve, in which a seal moves to press against a "volcano" style orifice. Further exemplary valves may include check valves, wherein a flap or other occlusion member seated on a base over the inlet orifice may be moved to an open valve position when the flowable firestop material 30 is introduced into the molding bag, and is then moved into a closed valve position by a biasing means, such as a spring, hinge, or connecting member which connects the flap or occlusion member to the base.

Figure 8:
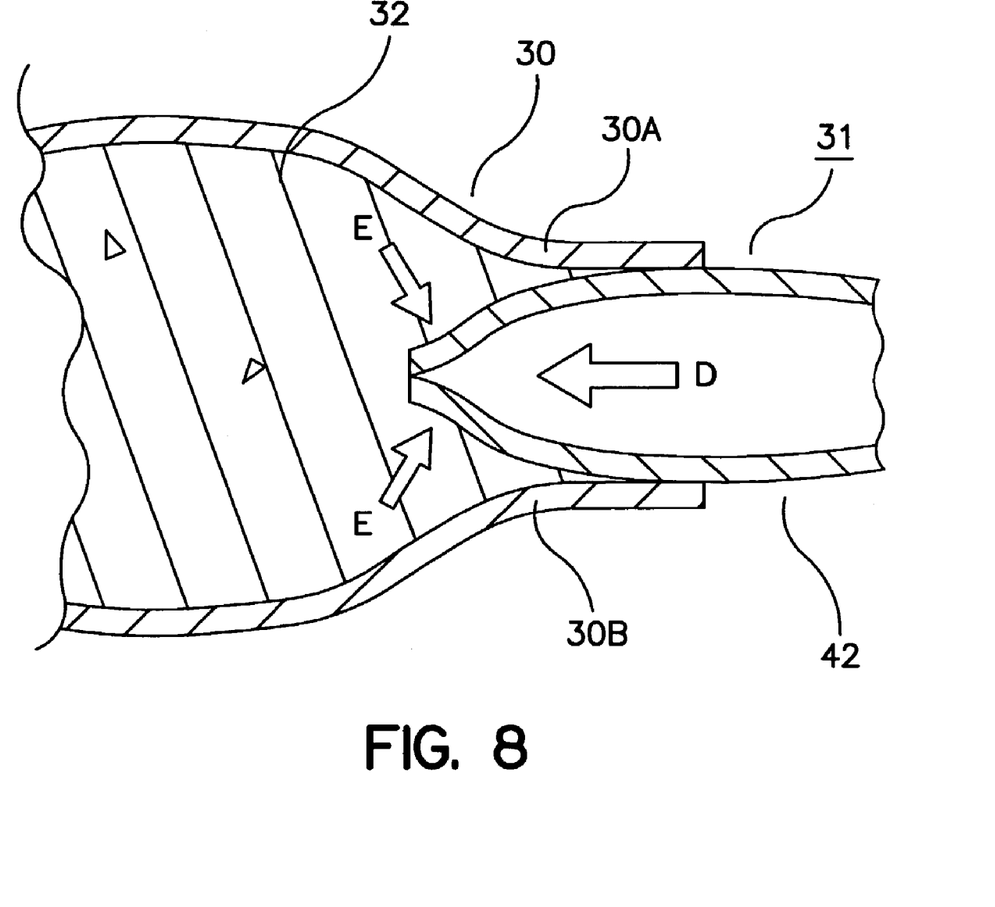
FIG. 8 is a partial diagram of an exemplary tube or sleeve inlet for allowing flowable firestop material to be introduced into molding bags.

As shown in FIG. 8, exemplary inlet valves may be incorporated as part of the seamed edges 31 of bags 30 (i.e., the seam 31 otherwise joins faces 30A and 30B) in the form of tubes or sleeves 42 which are operative to convey flowable firestop material 30 into the bag 30, in the direction designated by the arrow "D", and also operative to become sealed in a closed position by the pressure of the flowable firestop material 30 within the bag as shown by the arrows designated "E." The tube or sleeve 42 may be connected into the bag 30 at the seam using an adhesive, melt-sealing, or other means known; and may extend for any desirable length outside and beyond the molding bag 30. Using long tubes 42 may provide convenience in high head-of-wall joint assemblies located seven feet or more above floor level, because it would be possible, such as by using extended tubes or sleeves 42 which dangle from bags positioned on the top of the wall, to introduce flowable firestop material 32 into the molding bags without having to ascend a ladder. After filling, the tube or sleeve 42 can be tied or pinched off, reopened, and re-closed using string, rubber band, clip, or other convenient means, below the top of the wall.

Figure 9:
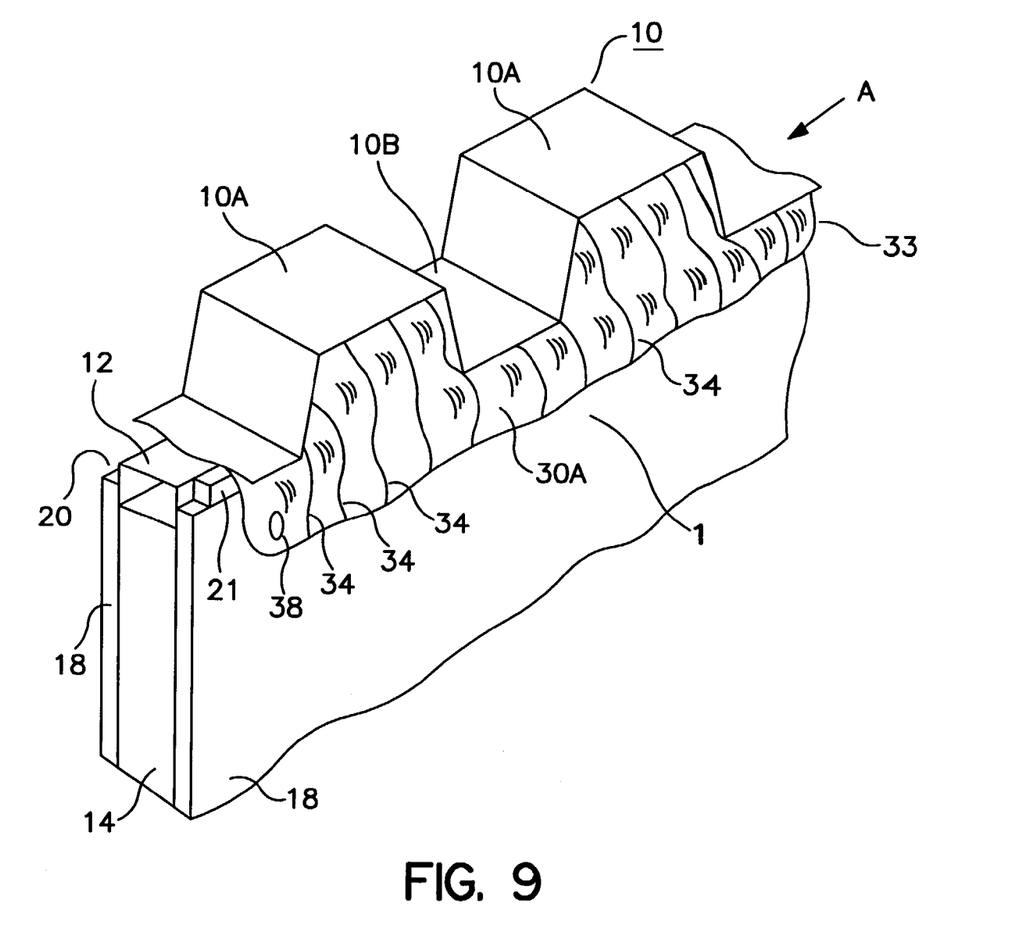
FIG. 9 is a perspective diagram of an exemplary thermal barrier installed in a "head-of-wall" joint assembly.

As shown in FIG. 9, an exemplary thermal barrier 1 of the invention can be used to fill one or more gaps or cavities in the "head-of-wall" joint defined between a fluted metal ceiling 10 and a metal stud assembly. The molding bag is positioned between the horizontal track 12 before the track 12 is fastened to the bottom surfaces 10B of the ceiling 10 (e.g., using screws or other fasteners). The metal studs 14 are then installed between the track 12 and floor (not shown), and one or more gypsum wallboards 18 are attached to one or both sides of the track/stud assembly (12/14/18). Preferably, a spacer strip 21 (e.g., mineral wool or foamed polystyrene or other compressible material) is inserted to protect the gap at the top of the wallboards 18. A flowable firestop material is then introduced into the bag 30 through an inlet 38, preferably located along a longitudinal edge of the bag 30. Preferably, the bag has a series of pleats 34 allowing the bag to expand when filled with the flowable firestop material. The flowable firestop material, under force of pressure, should travel along the longitudinal edges of the bag (designated at 33) which overhang on either side of the wall assembly (12/14/18), and should preferably fill the joint cavities between the top of the wall (12) and uppermost ceiling surface 10A as well as to fill the bag over the corner joints 20 above the wallboards 18.

Figure 10:
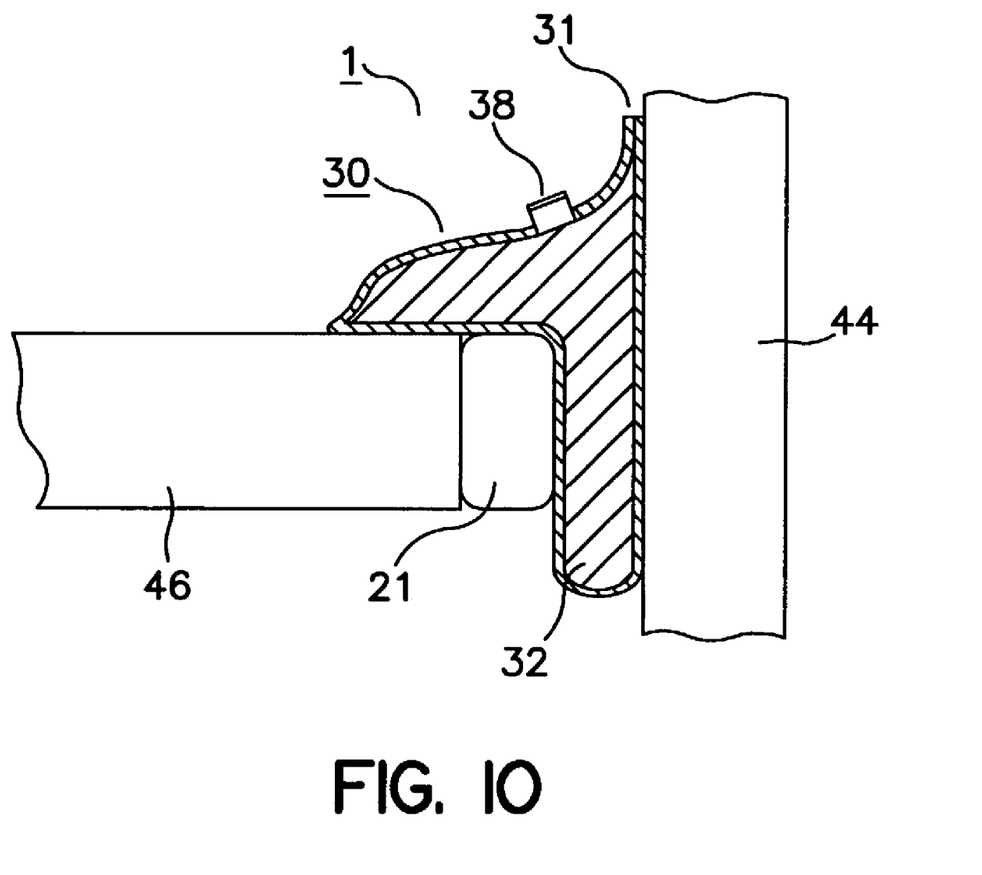
FIG. 10 is a diagram of another exemplary thermal barrier of the present invention installed in a joint gap between wall and floor.

As shown in FIG. 10, an exemplary thermal barrier molding bag 30 and method of the invention may be used to install a thermal barrier in a so-called "perimeter assembly" in the joint between a vertical wall 44 and floor 46. In this situation, it is preferable to use a spacer 21 which could be a plastic bag filled with air or a wad or stack of mineral wool, preferably wrapped in a sleeve or envelope, or other resiliently compressible object. The spacer 21 may be adhered or otherwise fastened to the floor 46 using known means. The molding bag 30 may be attached to the wall 44 such as by using nails or screws along the top edge or seam 31 of the bag, using a screw, nail, tack, or adhesive (such as used in structural waterproofing), or other known means. Preferably, the molding bag 30 has one or more inlets 38, such as screw caps, located towards the top of the bag. The inlets 38 may be used also for the purpose of evacuating residual air in the bag during the process of filling it with a flowable fireproofing material 32. Preferably, a portion of the bag extends across the gap between floor 46 and wall 44 and rests on a portion of the floor 46 without being attached or fixed to the floor so as not to impede movement of the floor or wall.

Figure 11:
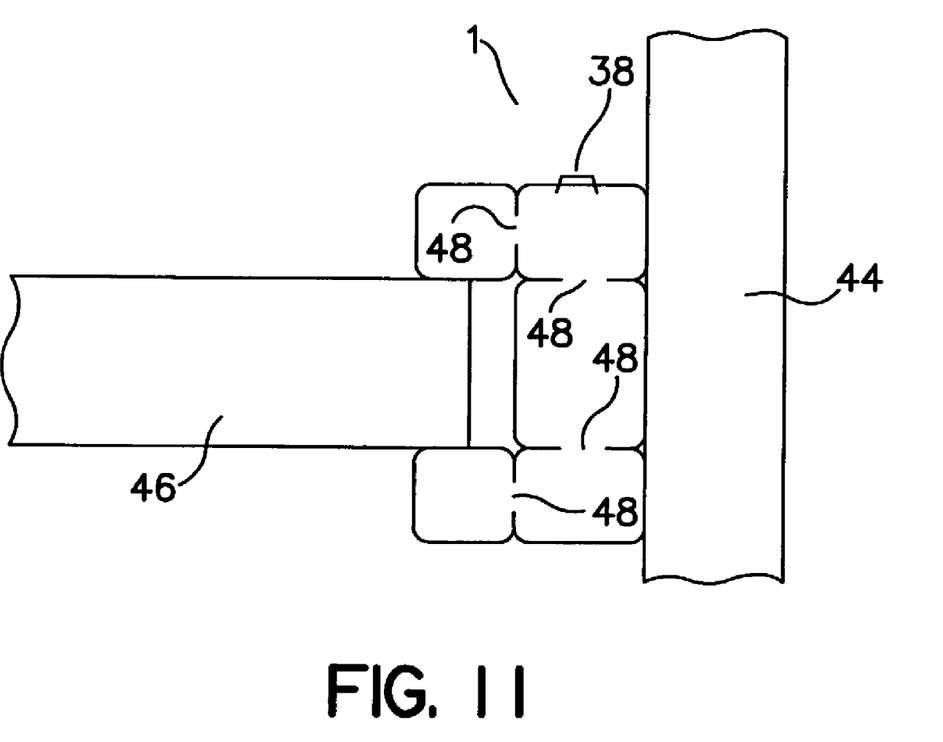
FIG. 11 is another exemplary thermal barrier of the present invention.

In further exemplary embodiments of the invention, a thermal barrier molding bag may comprise two or more compartments or, alternatively, comprise two or more bags connected to each other to permit flowable firestop material to be introduced into one bag (or compartment) to flow into a second bag (or compartment). As shown in FIG. 11, an exemplary thermal barrier bag 1 may be comprised of a plurality of bags or compartments extending longitudinally in the perimeter joint between floor and wall (or turned sideways, this could be an illustration of a ceiling and wall). Bag enclosures are connected to each other by a plurality of connecting holes or conduits as designated at 48. For example, plastic tube-like bags could be connected to each other periodically along their length, such as by the use of melt-sealing or grommets, at holes 48 to permit flowable firestop material to flow from one bag enclosure to another. The bag device 20 is preferably attached to the wall 44 adhesively or by mechanical fasteners.

Exemplary thermal barrier molding bags 30 of the invention may optionally have a pressure sensitive adhesive layer, grommets, or other means for allowing the bag to be adhered or mechanically attached to a wall, ceiling, floor, or other building or vessel structure. For example, the bottom side 30B of the bag 30 shown in FIG. 5 can be supplied with a two-sided tape, covered by a releasable sheet, to permit the bag device 30 to be adhered to the horizontal track 12 before it is fastened to or disposed against the ceiling, as illustrated in FIGS. 3 and 4.

In addition to use in "head-of-wall" joints and "perimeter barrier" joints, the thermal barriers and methods of the invention may be used with good advantage in protecting "penetration" openings, such as "annular" spaces in which cables, ducts, pipes, wires, or electrical panels are situated. An exemplary method of the invention comprises providing an opening in a building structure (e.g., wall, floor, or ceiling) having a cable, duct, pipe, wire, or electrical panel in said opening and defining an annular or otherwise partially occluded space within said opening; inserting into said space a thermal barrier molding bag; and introducing into said molding bag a flowable firestop material, such as described above. Consequently, the bag inflates and forms a seal within the opening to provide a barrier to both sides of the wall, ceiling, or floor opening. In cases wherein the conduit or electrical panel is not physically in contact with the surrounding wall, ceiling, or floor, then the space in the opening surrounding the conduit or electrical panel is completely annular (i.e., it surrounds the conduit), and this annular space can be filled, for example, by wrapping a molding bag at least once around the conduit. If the conduit is a plastic pipe or plastic covered wire or cable, it is preferable to use an intumescent material in the molding bag or outside of the bag but surrounding the conduit, such that if the conduit (e.g., plastic pipe, cable jacket) melts during the fire, then the intumscent material can expand under the effect of heat to fill the space left by the melted plastic.

When installed in the hole or joint gap of a building structure, the in-situ molded thermal barriers of the invention are tightly conformed to the shape of the structure or structures surrounding/defining the hole or joint gap. It is envisioned that preferred thermal barriers of the invention, when installed in joint assemblies, are capable of passing fire endurance tests and hose stream tests in accordance with the "UL Standard for Safety for Tests for Fire Resistance of Building Joint Systems, UL 2079," Third Edition, Dated Jul. 31, 1988, (Underwriters Laboratories, Inc., Northbrook, Ill.), incorporated fully herein by reference. Fire endurance testing pursuant to UL2079 involves exposing a sample portion of a joint assembly in a test furnace. More accurately speaking, the joint assembly is sealed against the furnace with an insulating gasket between the joint assembly and the furnace (UL 2079). The representative joint assembly can be, for example, a thermal barrier installed in a head-of-wall joint having one or more gypsum boards on either side of metal studs to simulate a wall (typically 2.5–8 inches or more in total thickness) and fluted metal plate to simulate a ceiling deck (as described above). One side of the thermal barrier in the joint would be exposed to heat of the furnace in accordance with a standard time-temperature curve (ASTM E119). This time-temperature curve has characteristic points, as follows:

50–90 degrees F. (10–32 degrees C.) at 0 minutes 1000 degrees F. (538 degrees C.) at 5 minutes 1300 degrees F. (704 degrees C.) at 10 minutes 1550 degrees F. (843 degrees C.) at 30 minutes 1700 degrees F. (927 degrees C.) at 1 hour 1850 degrees F. (1010 degrees C.) at 2 hours One or more thermocouples are installed against the thermal barrier on its "cool" side (i.e., unexposed side of joint opposite to that which is exposed to furnace), and the temperature of the thermocouple is monitored. The test is then conducted until failure is observed. Failure can be detected by holding a cotton waste pad (100 by 100 by 19 mm) directly over the observed crack or hole in the joint system, approximately 25 mm from the breached surface, for a period of 30 seconds. If the cotton ignites (glows or flames) within this period, then integrity failure has been reached. In the alternative, failure is said to be attained when the temperature of the thermocouple has risen by at least 325 degrees Fahrenheit above the starting temperature. Accordingly, exemplary thermal barriers of the present invention (made in situ, or, in other words, in the joint gap) have the ability to resist failure, for a minimum period of at least 60 minutes, and preferably for at least 120 minutes, when tested pursuant to the above-summarized fire endurance test in accordance with UL 2079.

Other preferred exemplary thermal barriers of the invention should have the ability to maintain barrier integrity when subjected to the hose stream test, which is also described in UL 2079. For example, a head-of-wall joint system is subjected to the above-described fire endurance test for a period of time not more than sixty (60) minutes, and then within ten (10) minutes thereafter the joint assembly is subjected to a stream of water delivered through a 2.5 inch (64 mm) hose and discharged through a National Standard playpipe of corresponding size equipped with a 1 ⅛ inch (29 mm) discharge tip of the standard-taper, smooth-bore pattern without a shoulder at the orifice. The water pressure and duration of the application is to be specified in the table below:

TABLE 1

(Pressure and Duration of Hose Stream Test)

| Hourly fire rating time, minutes | Water pressure at base of nozzle, Psi | (kPa) | Duration of application, seconds per square foot (s/m$^2$) of exposed area[a] | |
|---|---|---|---|---|
| 240 · time < 480 | 45 | (310) | 3.0 | (32) |
| 120 · time < 240 | 30 | (210) | 1.5 | (16) |
| 90 · time < 120 | 30 | (210) | 0.90 | (9.7) |
| time < 90 | 30 | (210) | 0.60 | (6.5) |

[a]The rectangular area of the structure in which the joint system is mounted is to be considered as the exposed area, as the hose stream must traverse this calculated area during application.

Accordingly, preferred thermal barriers of the invention (made in the joint gap), subsequent to application of the aforementioned fire endurance test, should be able to pass the hose stream test, in accordance with UL 2079. In other words, the thermal barriers should demonstrate the ability to resist dislodgement from the joint gap by water pressure from a hose, for a given period of time, as indicated above in the chart with respect to the applicable hourly fire rating time. The nozzle orifice is to be 20 feet (6.1 m) from the center of the exposed surface of the joint system if the nozzle is so located that, when directed at the center, its axis is normal to the surface of the joint system. If the nozzle is unable to be so located, it shall be on a line deviating not more than 30 degrees from the line normal to the center of the joint system. When so located its distance from the center of the joint system is to be less than 20 feet (6.1 m) by an amount equal to 1 foot (305 mm) for each 30 degrees of deviation from the normal (UL 2079).

The foregoing discussion and examples are provided for illustrative purposes and not intended to limit the scope of the invention as claimed.

We claim:

1. A building joint structure, comprising: a barrier molded in a joint gap between a first structure comprising a wall and a second structure comprising a ceiling or floor, said molded barrier comprising a thermal barrier bag comprising: two flexible sheets seamed together to provide a bag having an elongated body and containing a hydratable cementitious composition, one of said flexible sheets having a plurality of pleats arranged perpendicularly with respect to said elongated body.

2. The building joint structure of claim 1, wherein said bag is located in a head-of-wall joint.

3. The structure of claim 1 wherein said bag has longitudinal edges, and further comprising at least one closeable inlet valve for introducing said composition into said bag, said at least one closeable inlet valve being positioned along a longitudinal edge of said bag.

4. The structure of claim 1 wherein said bag has longitudinal edges, and further comprising at least one closeable inlet valve for introducing a flowable firestop material into said bag, said at least one closeable inlet valve being located towards the center between said longitudinal edges.

5. A building joint structure, comprising: a barrier molded in a joint gap between a first structure comprising a wall and a second structure comprising a ceiling or floor, said moldedbarrier comprising a thermal barrier bag enclosure having an elongated body and containing a hydratable cementitious composition, said bag having a plurality of pleats to permit expansion of said bag when said cementitious composition is introduced to said bag, said bag further having a plurality of holes, operative to release air pressure when said cementitious composition is introduced.

6. The joint structure of claim 5 wherein said bag is adjacent a horizontally-extending track positioned between said first structure and said second structure.

* * * * *